UNITED STATES PATENT OFFICE.

JOHANNES JACOBUS LOKE AND WILLEM ALEXANDER LOKE, OF THE HAGUE, NETHERLANDS.

PROCESS FOR THE DIRECT PRODUCTION OF REFINED IRON AND REFINED STEEL FROM TITANIFEROUS IRON ORES.

1,328,636.   Specification of Letters Patent.   Patented Jan. 20, 1920.

No Drawing.   Application filed September 29, 1916. Serial No. 122,920½.

*To all whom it may concern:*

Be it known that we, JOHANNES JACOBUS LOKE and WILLEM ALEXANDER LOKE, both subjects of the Queen of the Netherlands, and both residing at Groot Hertoginnelaan 231, The Hague, Netherlands, have invented a certain new and useful Process for the Direct Production of Refined Iron and Refined Steel from Titaniferous Iron Ores, of which the following is a specification.

This invention relates to a new process for the direct production of refined iron and refined steel from titaniferous iron ores.

Series of trials for the treatment of titaniferous iron-sand, which are volcanic products from Java and elsewhere, for the manufacture of iron and steel, enable us to fix the following statements:—

The titaniferous iron-sand can easily be separated mechanically in order to obtain a purified titaniferous iron ore containing about 94% titaniferous iron-oxids, i. e., about 78% iron-oxid and 16% titanic acid.

This purified ore is simply melted by any desired means or source of heat at a temperature sufficiently high to obtain and maintain a very liquid mass.

In this condition of fusion, the reducing process is effected by blowing reducing gases through the molten compound similarly to the way in which air is blown into iron in the Bessemer or other converter.

At the temperature of 1600° up to 2000° C., the reduction is completed only as far as concerns the iron-oxids, as the titanic acid needs a temperature of at least 2000° C., for reduction.

As soon as the reduction of the iron ore starts, the molten mass to be reduced is covered by the heavy slag of titanic acid, preventing any contact with air, i. e., reoxidizing of reduced iron oxids.

On the temperature surpassing 2000° C., the slag of titanic acid starts to be reduced, which reduction is constant and regular at the under part of the slag, but is irregular at the upper part, where, having worked through the layer of titanic acid slag, the reducing proceeds in contact with air which causes new slag to be formed owing to the combination with nitrogen, oxygen, hydrogen or the like.

The titanium produced by the reduction of the under part of the slag in contact with the molten iron or steel, effects however, such an intensive refining in these metals, that these first products, directly refined by titanium show marvelous properties, still unknown in iron and steel manufacture, where no temperatures of 2000° C. and higher are applied.

In carrying out the invention, according to one mode in which this process is applied, we choose for raw material the said purest and richest iron ore in existence, being volcanic titaniferous iron sand, containing about 78% iron oxids and 16% titanic acid.

This iron ore is first melted in an electrical furnace, preferably of the resistance type, in which the pure ore can be melted easily and quickly at a temperature of at least 1600° C.

As soon as the molten compound is very liquid, the reduction is effected by blowing reducing gases—for instance, carbon monoxid or water-gas (blue gas) through the mass in fusion.

By the oxidizing of these gases the temperature in the molten mass rises considerably and a quick and complete reduction of the iron oxids will soon be accomplished. In the meantime, the temperature in the molten mass is raised to over 2000° C., causing a reduction of the titanic acid slag on the under part of which the produced titanium, with a specific gravity of 5.17 and a melting point of about 2400° C., effects a complete refining of the produced iron or steel. The question of whether iron or steel will be produced depends of course on the quantities of reducing gases which are blown in.

Having now described our invention, what we claim as new and desire to secure by Letters Patent is:—

1. The process for the production of an iron product, that consists in the passing of reducing gases through a molten mass of iron-oxid, protected from air, and titanium compounds at a temperature that will reduce the titanium compounds.

2. The process for the production of an iron product, that consists in the passing of reducing gases through a molten mass of iron-oxid, protected from air, and slag containing titanic acid at a temperature that will reduce the titanic acid.

3. The process for the production of an iron product that consists in the heating of titaniferous iron ore to a temperature sufficiently high to convert iron-oxid into a molten mass, in passing a reducing gas through the molten mass, in protecting the upper surface of the molten mass from contact with air by means of a slag containing titanium compounds, and in raising the temperature to produce a reduction of the titanium compounds in the slag layer.

4. The process for the production of an iron product that consists in the heating of titaniferous iron ore to a temperature sufficiently high to convert iron-oxid into a molten mass, in passing a reducing gas through the molten mass, in protecting the upper surface of the molten mass from contact with air by means of a slag containing titanium compounds, and in raising the temperature to substantially not less than 2000° C.

5. The process for the production of an iron product that consists in the heating of titaniferous iron ore to a temperature that will convert iron-oxid into a molten mass, in passing a reducing gas through the molten mass, in raising the temperature to form a slag containing titanium compounds, and in continuing the treatment of the molten mass by the reducing gas until that portion of the slag layer in contact with the liquid is melted.

6. The process for the production of an iron product that consists in the heating of titaniferous iron ore to a temperature that will convert the iron-oxid into a molten mass, in passing a reducing gas through the molten mass, in raising the temperature to form a slag containing titanium compounds, and in continuing the treatment of the molten mass by the reducing gas until that portion of the slag layer in contact with the liquid is melted and the titanium compounds are reduced.

In testimony whereof we have signed our names to this specification.

JOHANNES JACOBUS LOKE.
WILLEM ALEXANDER LOKE.